United States Patent [19]
Doellner

[11] 3,897,028
[45] July 29, 1975

[54] OPTICALLY LINKED MISSILE
[75] Inventor: O. Leonard Doellner, Seattle, Wash.
[73] Assignee: The Boeing Company, Seattle, Wash.
[22] Filed: Sept. 10, 1973
[21] Appl. No.: 396,039

[52] U.S. Cl. ................................................ 244/3.1
[51] Int. Cl. ........................................... F42b 15/00
[58] Field of Search ................ 244/3.1; 102/70.2 A; 350/96

[56] References Cited
UNITED STATES PATENTS

| | | | |
|---|---|---|---|
| 3,362,329 | 1/1968 | Epstein | 102/70.2 A |
| 3,408,937 | 11/1968 | Lewis et al. | 102/70.2 A |
| 3,434,776 | 3/1969 | Kern | 350/96 R |
| 3,530,341 | 9/1970 | Hutchinson | 350/96 B |
| 3,561,859 | 2/1971 | Heckscher et al. | 350/96 R |
| 3,620,166 | 11/1971 | Bratton et al. | 102/70.2 A |

Primary Examiner—Samuel W. Engle
Assistant Examiner—C. T. Jordan
Attorney, Agent, or Firm—Donald A. Streck

[57] ABSTRACT

A missile employing an interconnection system for the transfer of control signals between missile segments whereby effects of electrostatic and electromagnetic fields can be eliminated and weight reduced through the use of fiber optics to replace usual shielded cables for interconnections.

2 Claims, 4 Drawing Figures

PATENTED JUL 29 1975

SHEET 1

3,897,028

OPTICALLY LINKED MISSILE

BACKGROUND OF THE INVENTION

1. Field of the Invention

The present invention relates to control system interfaces and more particularly to means for interconnecting control system subsystems within a missile.

2. Description of the Prior Art

Operational missile systems are exposed to a hostile electromagnetic environment containing such potentially false data introduction sources as electrostatic charging, electromagnetic interactions, and electromagnetic pulses. This electromagnetically hostile environment begins immediately upon initiation of the missile's aft-most engine. The missile is first engulfed in its exhaust, with molecular particles streaming over its surface at high temperatures and velocities. Electro-interference noise generation effects occur as a result of this missile plume alone. As the missile lifts off its resting place with rapidly increasing speed, atmospheric particles impinge on the missle skin causing triboelectric electrostatic charging. This is especially severe when the vehicle flies through clouds containing ice crystals or through smoke or dust particles. Protection from the effects of this environment is normally accomplished with unit housing, missile skin and cable shielding. Present day raceway cable shielding, however, is heavy and problems related to it can be formidable.

Other basic charging mechanisms include items such as engine charging which is caused by electron diffusion within the combustion chamber walls with the effect that a predominantly positive plasma is exhausted from the engine thereby imparting a negative charge to the missile. The missile can and frequently does become charged to very high potentials and some missiles use corona dischargers (as do airplanes) to dissipate this potential and diminish the resulting electromagnetic noise problem.

Electromagnetic interference also results from occasional lightning discharges to the missile and from various ordnance power discretes which are issued throughout the flight. If the missile is not well electrically bonded together, dielectric breakdown between isolated substructures may occur as a result of the charges built up on a missile during flight. These dielectric discharges result in additional electromagnetic interference.

In addition, military missiles are threatened by electromagnetic surges from nuclear explosions which are capable of paralyzing the critical circuitry controlling missiles and related weapons.

The weak link in design of existing missiles operating in the environment thus described is precipitated by the necessity of having to send data signals fairly long distances along the missile structure between the guidance intelligence center located forward in the missile and the control mechanisms remotely located at the aft end of the missile stages. Both ends of the linkage terminate in naturally well shielded enclosures since the guidance intelligence and control mechanisms are contained in unit housings and, generally, also missile skin. A plain wire interconnection is, of course, prone to the inducement of erroneous currents when cut by any electromagnetic force. Consequently, present missiles interconnect the guidance intelligence to the control mechanisms using heavy shielded cables in electrical interconnecting raceways. Not only does this cost in weight of the components, but in reliability as well. Unless all shielding is properly interconnected and at the same electrical potential, erroneous signals can be introduced into the shielding itself. Such shielded interconnecting cables also cause a problem when missile stages separate. At that time any interconnecting cables must be severed or separated to allow the inactive stage to move away from the remaining stages. Shielded cable is difficult to cut and requires complicated devices to assure its timely and complete severance. Mechanical separators e.g. guillotines or separable connectors add additional problems to the circuit. Glass or plastic fiber optics, on the other hand, would easily part from the tensile forces of the stages separating or would be carried away by the explosive charge normally used to accomplish staging in a missile.

Because of operating environments, particularly in military environments, ease of field modification capability and field maintenance is a prime concern in the design of any missile component.

Thus it is an object of the present invention to provide a missile employing means for interconnecting control subsystems which are immune to the effects of such forces as electrostatic charging, electromagnetic interactions, and electromagnetic pulses.

It is another object of the present invention to provide a missile employing means for interconnecting control subsystems which are highly reliable, light in weight, and easily maintainable.

It is yet another object of the present invention to provide a missile with a minimum raceway profile.

It is a further object of the present invention to provide a missile employing means for interconnecting control subsystems which are easily and reliably severed without specialized equipment.

Other objects and advantages of the present invention will become apparent from the figures and specifications which follow.

DESCRIPTION AND OPERATION OF THE INVENTION

Figure 1:
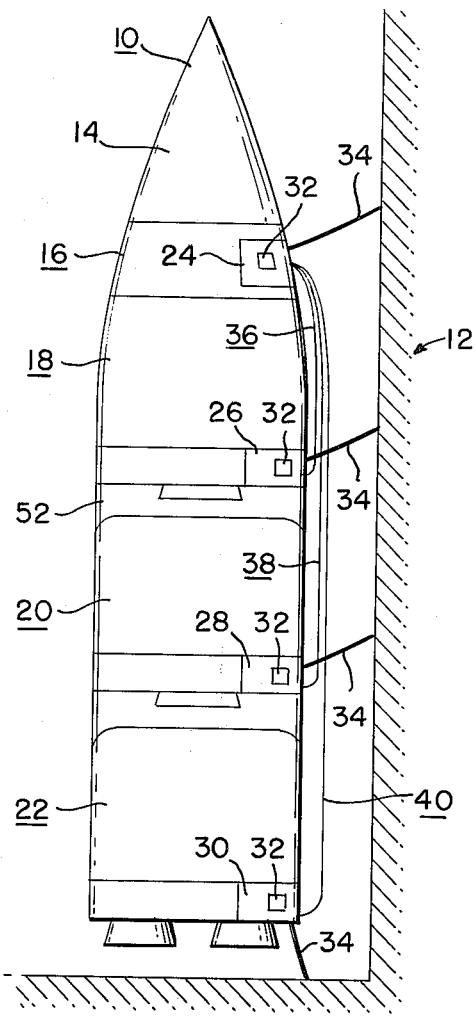
FIG. 1 shows the configuration of a missile designed to employ the interconnecting system as disclosed by the present invention.

Referring to FIG. 1, missile assembly 10 is held and contained by support structure 12. The missile assembly 10 is comprised of a re-entry system/payload 14, a missile guidance subsystem assembly 16 and a plurality of power stage assemblies as shown being stage III 18, stage II 20, and stage I 22. The missile guidance subsystem assembly 16 and the power stage assemblies 18, 20 and 22 each contain a unit housing as shown being a missile guidance unit housing 24, a stage III unit housing 26, a stage II unit housing 28, and a stage I unit housing 30. Each unit housing 24, 26, 28, and 30 contains a battery means 32 and is connected to ground power, data, and coolant means (not shown) contained in support structure 12 by umbilical cord means 34. Missile guidance unit housing 24 is connected to stage III unit housing 26 by a stage III interconnection assembly 36. Missile guidance unit housing 24 is connected to stage II unit housing 28 by a stage II interconnection assembly 38. Missile guidance unit housing 24 is connected to stage I unit housing 30 by a stage I interconnection assembly 40. Guidance commands and data are sent between the missile guidance subsystem assembly 16 and the control mechanisms (not shown) in the power stage assemblies 18, 20, and 22 via the three stage interconnection assemblies 36, 38, and 40 interfacing through the unit housings 24, 26, 28, and 30.

Figure 2:
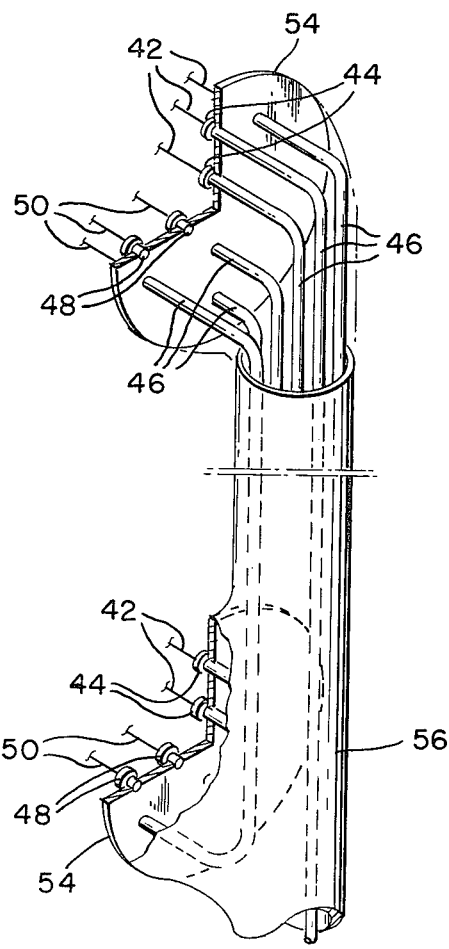
FIG. 2 shows the preferred embodiment for routing and connecting the electro optical elements which comprise the interconnecting system disclosed by the present invention when interconnecting is done external to the missile.

Referring to FIG. 2, electrical signals from the missile guidance subsystem assembly 16 are impressed on appropriate outgoing signal wires 42. Each outgoing signal wire 42 is operably connected to a light emitting diode 44. Each light emitting diode 44 is operably attached to the end of a fiber optic coupling means 46 such that when an electrical signal is presented to a light emitting diode 44 the light emitting diode 44 will cause an illuminating signal to enter the corresponding fiber optic coupling means 46, travel the length of the fiber optic coupling means 46 and emerge from the opposite end of the fiber optic coupling means 46. The end opposite that having the light emitting diode 44 on each fiber optic coupling means 46 has a photo detector 48 operably attached thereto. When an illuminating signal as described above emerges from the end of a fiber optic coupling means 46 it will strike the photo detector 48 causing an electrical signal to be generated by the photo detector 48. This electrical signal is impressed on an incoming signal wire 50 which is operably attached to the photo detector 48 and to an appropriate control mechanism (not shown). Thus the command signal is transmitted to or from the missile guidance subsystem assembly 16 by electricity/light/electricity to or from the appropriate control mechanism (not shown).

It is important to note that the electrical/light interface occurs at or near the missile skin 52 in the present invention. As depicted in FIG. 1, control signals inside the missile skin 52 of the missile assembly 10 operate electrically while the same data external to the missile skin 52 of the missile assembly 10 move optically. Thus, the only potentially vulnerable areas in the missile skin 52 where undesired electrical, magnetic, or electro static signals can enter is where the fiber optic coupling means 46 pass through the missile skin 52. Any unshielded hole in the missile skin 52 larger than the wave length of the undesired signals will allow them to pass through the missile skin 52 into the interior of the missile assembly 10. Since it is contemplated that the fiber optic coupling means 46 will typically be of the 50 mils diameter or smaller range, each fiber optic coupling means 46 could pass through the missile skin 52 through an individual hole. For many missiles, however, such an arrangement would be undesirable. FIG. 2 depicts a preferred embodiment offering ease of fabrication and maintenance while preserving the shielding integrity of the missile skin 52. The electrical/light interfaces are contained in shielding plates 54. Each shielding plate 54 contains a plurality of holes for the fiber optic coupling means to pass through as described above. The light emitting diodes 44 and photo detectors 48 are attached to or near the shielding plates 54 as shown. At each interface point in the missile skin 52 a hole slightly smaller than the shielding plate 54 allows outgoing signal wires 42 and incoming signal wires 50 to pass into the interior of the missile assembly 10 and in particular into unit housings 24, 26, 28, and 30 while the shielding plates 54 cover the hole in the missile skin 52 and are securely fastened in place. As further shown in FIG. 2, in the preferred embodiment the fiber optic coupling means 46 are contained in a fiber optic raceway 56 interconnecting the shielding plates 54.

Figure 3:
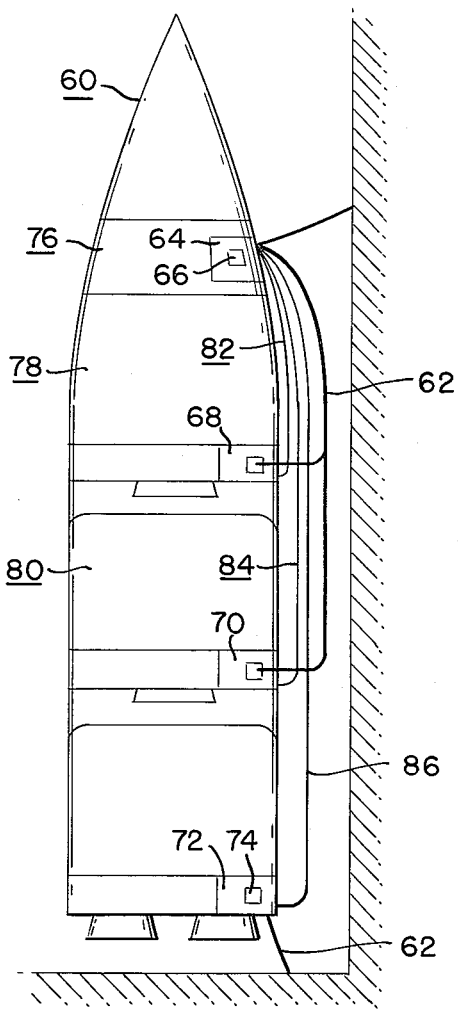
FIG. 3 shows the configuration of a missile retrofitted to employ the interconnecting system as disclosed by the present invention.

While a new missile can be manufactured incorporating the present invention concepts, it is important to note that a missile as contemplated by the present invention can be had through retrofit of existing missiles. This is shown in FIG. 3. The retrofitted missile assembly 60 is substantially identical to the missile assembly 10 of FIG. 1 described above. The point of difference is in the number of batteries employed in the missile. In a new or existing missile employing a battery 32 in each of the power stage assemblies 18, 20, and 22 and the missile guidance subsystem assembly 16 as shown in FIG. 1, the previously described embodiment can be employed. Where at least one power stage assembly of the missile does not contain a battery, the alternate embodiment of FIG. 3 would have to be employed.

Referring to the retrofitted missile assembly 60 of FIG. 3, power line 62 transfers power from the missile guidance unit housing 64 containing battery 66 to the stage III unit housing 68 containing no battery and the stage II unit housing 70 also containing no battery. The stage I unit housing 72 containing battery 74 does not require power line 62. Power line filtering means (not shown) would have to be included to prevent surges from entering the sensitive electronics contained in the missile guidance subsystem assembly 76, the stage III power assembly 78 and the stage II power assembly 80 containing no batteries. Stage III interconnection assembly 82, stage II interconnection assembly 84, and stage I interconnection assembly 86 would be constructed as described in conjunction with missile assembly 10 of FIG. 1.

Figure 4:
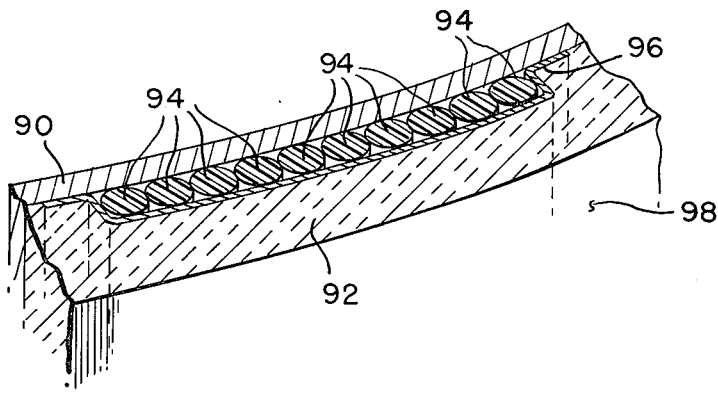
FIG. 4 shows the method of routing the electro optical elements which comprise the interconnecting system disclosed by the present invention when the missile is operated from a silo not allowing clearance for interconnections external to the missile.

FIG. 4 shows the method of routing the fiber optic coupling means 46 of FIG. 1 particularly when the missile is to be operated from a silo wherein the missile is in close proximity to the silo wall thereby requiring a minimal raceway cross-section. In such a configuration, the missile skin 90 is coated with an ablative material 92 to protect the missile skin 90 from the extreme heats generated. In such an application the fiber optic coupling means 94 are routed side by side adjacent to the missile skin 90 as shown in FIG. 4. The fiber optic coupling means 94 are contained and maintained in this position by a titanium raceway shield 96. The ablative material 92 then covers the entire missile providing a smooth exterior surface 98. Alternately, an additional layer of the ablative material 92 could be placed between the missile skin 90 and the fiber optic coupling means 94 as well to provide additional protection for the fiber optic coupling means 94.

Having thus described my invention, what is claimed is:

1. In a missile composite structure comprising a reentry system/payload, a missile guidance subsystem, and at least one power stage assembly all enclosed in a missile skin, apparatus for transmitting control signals and data between the missile guidance subsystem and the power stage assembly comprising:
   a. first transformation means operably connected for responding to said control signals and data as first electrical signals and for transforming said first electrical signals into corresponding light signals;
   b. fiber optic means operably disposed with one end adjacent to said first transformation means for receiving and transmitting said light signals between the missile guidance subsystem and the power stage assembly;
   c. first shielding means for passing said fiber optic means through the skin of the missile adjacent to said first transformation means, said first shielding means containing a first hole for the passage of said fiber optic means;
   d. a fiber optic raceway disposed adjacent to said first shielding means so as to receive said fiber optic means from said first shielding means, said fiber optic raceway being a conduit containing and protecting said fiber optic means, said fiber optic raceway being so shaped as to hold said fiber optic means adjacent to the external surface of the skin of the missile, said fiber optic raceway containing said fiber optic means being contained within an ablative coating covering the skin of the missile;
   e. second shielding means for passing said fiber optic means through the skin of the missile adjacent to second transformation means, said second shielding means being disposed to receive said fiber optic means emerging from the end of said fiber optic raceway opposite the end of said fiber optic raceway adjacent to said first shielding means, said second shielding means containing a second hole for the passage of said fiber optic means; and,
   f. second transformation means operably connected for responding to said light signals and for transforming said light signals into control signals and data as second electrical signals.

2. In a missile composite structure comprising a reentry system/payload, a missile guidance subsystem, and at least one power stage assembly all enclosed in a missile skin, apparatus for transmitting control signals and data between the missile guidance subsystem and the power stage assembly comprising:
   a. first transformation means operably connected for responding to said control signals and data as first electrical signals and for transforming said first electrical signals into corresponding light signals;
   b. fiber optic means operably disposed with one end adjacent to said first transformation means for receiving and transmitting said light signals between the missile guidance subsystem and the power stage assembly;
   c. first shielding means for passing said fiber optic means through the skin of the missile adjacent to said first transformation means, said first shielding means containing a first hole for the passage of said fiber optic means;
   d. a fiber optic raceway disposed adjacent to said first shielding means so as to receive said fiber optic means from said first shielding means, said fiber optic raceway being a conduit containing and protecting said fiber optic means, said fiber optic raceway being a passageway in an ablative coating covering the skin of the missile;
   e. second shielding means for passing said fiber optic means through the skin of the missile adjacent to second transformation means, said second shielding means being disposed to receive said fiber optic means emerging from the end of said fiber optic raceway opposite the end of said fiber optic raceway adjacent to said first shielding means, said second shielding means containing a second hole for the passage of said fiber optic mean; and,
   f. second transformation means operably connected for responding to said light signals and for transforming said light signals into control signals and data as second electrical signals.

* * * * *